(12) United States Patent
Foster, Sr.

(10) Patent No.: US 6,553,696 B1
(45) Date of Patent: Apr. 29, 2003

(54) FLOURESCENT DRINK RIM

(76) Inventor: Robert Foster, Sr., 775 Youngneck Rd., Mobile, AL (US) 36608

( * ) Notice: Subject to any disclaimer, the term of this patent is extended or adjusted under 35 U.S.C. 154(b) by 0 days.

(21) Appl. No.: 09/658,107

(22) Filed: Sep. 8, 2000

Related U.S. Application Data

(60) Provisional application No. 60/154,399, filed on Sep. 17, 1999.

(51) Int. Cl.[7] .................................................. B65D 51/00
(52) U.S. Cl. ........................... 40/324; 362/101; 215/200
(58) Field of Search .................. 40/306, 324; 362/101; 215/200

(56) References Cited

U.S. PATENT DOCUMENTS

| | | | | |
|---|---|---|---|---|
| 4,832,214 A | * | 5/1989 | Schrader et al. ............ | 215/11.1 |
| 5,171,081 A | * | 12/1992 | Pita et al. .................... | 362/101 |
| 5,807,156 A | * | 9/1998 | Owen ......................... | 215/11.1 |
| 6,092,905 A | * | 7/2000 | Koehn ......................... | 362/101 |

* cited by examiner

Primary Examiner—Cassandra H. Davis

(57) ABSTRACT

A cover with a top opening for a container having a container rim has a removable top cover. The cover may be used with a straw by piecing or removing the top cover. The top opening has a perimeter and at least a portion of the top opening has a perimeter treated with a bulb or fiber optics or flourescent material which glows in the dark after exposure to light or in reaction to an influx of power. The cover may be removable or permanently attached to the container along the container rim. A brand identifier may also be illuminated. A tab type lever may be used as the illuminated top cover. The flourescent paint may be sealed within a clear container.

8 Claims, 3 Drawing Sheets

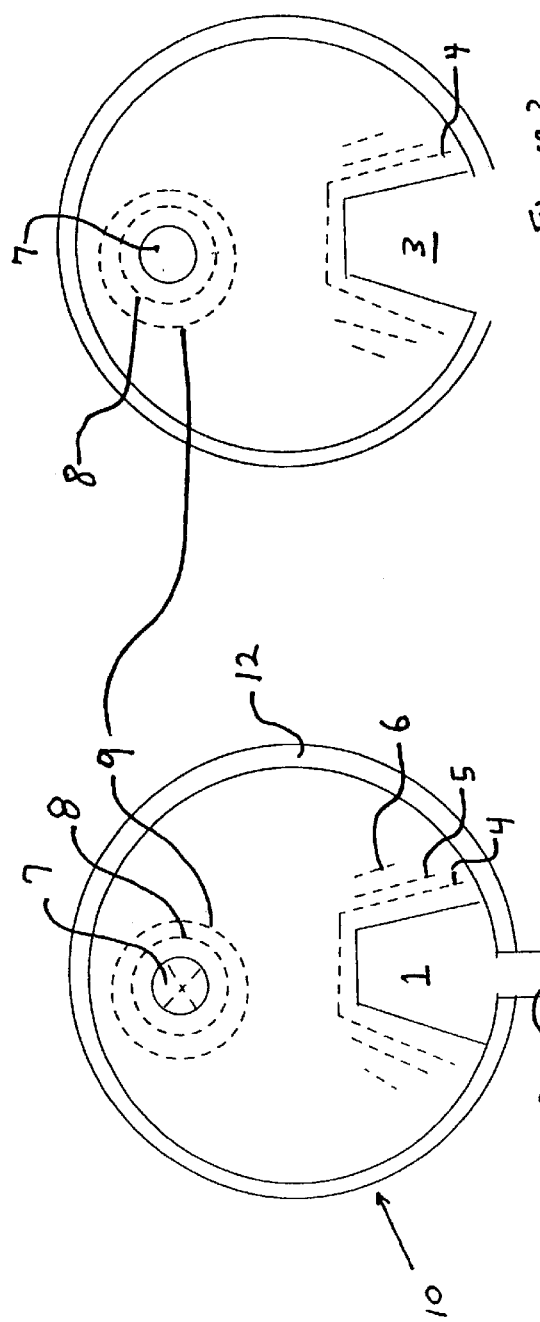
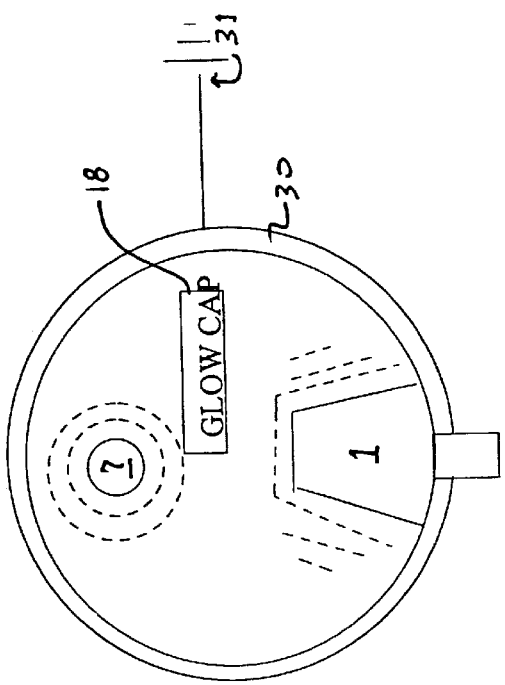

FLOURESCENT DRINK RIM

PRIORITY

This patent is a continuation of Provisional Patent Serial No.: 60/154,399 filed Sep. 17, 1999.

BACKGROUND OF INVENTION

1. Field of Invention

The present invention pertains to drink holders and the cups contained therein. More particularly, the present invention pertains to flourescent caps and rims for drink holders.

2. Prior Art

The only known prior art are caps for drinks having various structural designs and holders for drinks having various designs.

GENERAL DISCUSSION OF THE INVENTION

The invention comprises a drink holder having a top and a lid for going on top of a drink which can glow in the dark so that the user may identify significant portions of the drink holder and of the drink top.

In the preferred embodiment, the tear away portion of a drink top and the area surrounding the tear away portion of the drink top for hot drinks may be marked with a glow means, usually a flourescent paint or non-paint material, so that the user can identify the tear portion to be torn away to expose a top opening. The tab attached to the tear portion to be torn away may be similarly treated. The area around the top opening exposed by removing the tear portion may be treated with a glow means so that the user may thereafter identify the opening in the dark. Likewise the entire top may be glow in the dark so that when a tear portion is torn away, as by pulling it away with a tab, the darkened area remaining would indicate where the top opening is located.

Non-flourescent technology could also be used. A light, carried in this example by fiber optics, could travel around the rim of the drink container or drink holder as described below. The light to be carried in this fashion could be generated by a bulb powered by a battery at a remote location and carried by the fiber optics to the drink rim. This would be a particularly significant improvement where the drink container was in a vehicle and the optics could be wired through the vehicle battery.

This would allow the user, after the application of a light or other triggering reaction to begin the fluorescence, to identify the glowing portion or area and the dark portion which would be the opening.

Similarly the area around a straw opening where a straw would be inserted could be surrounded by flourescent material so that the user could the spot where the straw was inserted.

In addition, a drink holder is described having a rim into which the drink fits. This rim could be made to glow in the dark so that when the drink container (a can or cup) was removed from the drink holder the drink holder rim would glow and be visible in the dark to make it easier to place the drink container within that location. The drink container could be a molded part of the car or could be a separate product attachable to. the car as within the window as is known in the prior art. The inventive concept is the lighting, through electric or flourescent means.

Different colors could be used for different portions of the drink holder in order to make it more easily identified.

These improvements could also be incorporated in a reusable cup. In that case either the opening of the top could be illuminated or using the same or a different color a switch on a cup could be moved to the open position allowing a marker for that open position to either illuminated or darkened.

In addition to the lid being made of glow in the dark material could be made of a hyper reflective material. The rim of a cup may be similarly lit to allow easier placement or replacement of the lid and in order for the user to visualize where the lid is going on the cup.

It is therefore an object of the invention to provide for a glow in the dark lid for a drink container.

It is a further object of the invention to provide a lid for a drink container which indicates the position of the opening in the lid.

It is a further object of the invention to provide a lid for a drink container which indicates the position of the tab or lever for opening the lid.

It is a further object of the invention to provide a holder for a drink container which indicates the position of the opening in the top of the holder to allow the user to find it easier in the dark.

These and other objects and advantages of the invention will become better understood hereinafter from a consideration of the specification with reference to the accompanying drawings forming part thereof, and in which like numerals correspond to parts throughout the several views of the invention.

BRIEF DESCRIPTION OF DRAWINGS

For a further understanding of the nature and objects of the present invention, reference should be made to the following detailed description taken in conjunction with the accompanying drawings in which like parts are given like reference numerals and wherein:

FIG. 1 shows a lid for a cup which incorporates the flourescent cap.

FIG. 2 shows the lid of FIG. 1 with the removable tab taken off.

FIG. 6 shows a top view of an alternate glow cap.

DETAILED DESCRIPTION OF THE PREFERRED EXEMPLARY EMBODIMENTS

Figure 3:
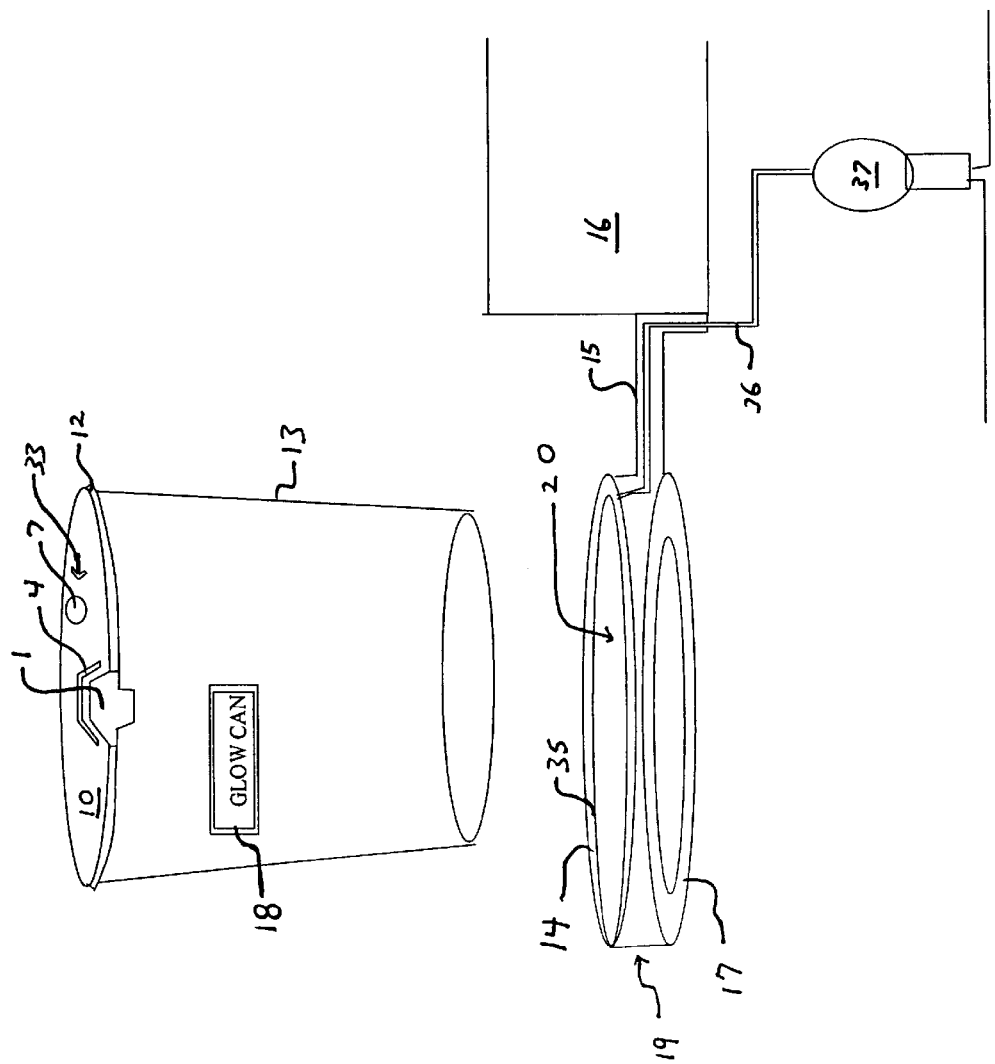
FIG. 3 shows a side view of a cup with a holder incorporating a flourescent rim and shows a cup holder incorporating a glow rim incorporating fiber optic lighting.

FIG. 1 shows a drink cap 10. The cap has a removable section 1 which may have a tab 2 which may be easily grasped by the user. In the preferred embodiment, this tab would have a flourescent coating so that it could be easily seen in the dark after a short exposure to light. The removable section 1 might have the same or different color for the same purpose.

In order to assist the user locating the top opening 3 (shown in FIG. 2) left when the removable section 1 is removed, a series of flourescent stripes 4, 5, and 6 are shown. The widest band 4, in this embodiment, is the one which surrounds the opening 3. The middle band is more narrow than the widest band 4, but may be wider than the most narrow outer band 6. Similarly, the bands 4, 5 and 6 may be color coded with different color flourescent colorings. The best example would be an outer band 6 of green, a middle band, 5 of yellow and the inner band 4 of red.

These coatings may be covered-with a clear material in order, to prevent ingestion of the paints used when the user is drinking from the container. They may also be chemically incorporated into the material from which the cap 10 is produced.

Because these caps 10 may also have a straw hole 7 which needs to be found, this straw hole 7 may be flourescent or it may have similar inner bands 8 and one or more outer bands 9 so that the straw hole 7 may be easily located in the dark after a short exposure to light so that a straw may be easily inserted. There may be colored flaps over the hole.

As can be seen by reference to FIG. 6, the edge 30 of a top 10 may be illuminated from a power source 31. In addition to this lighted rim 30 and the flourescent material 8, 9, 4, 5 and 6, a trademark 18 or other design may be present as shown in FIG. 6 and may be illuminated by flourescent material or an electric source.

All of the tops or caps have an outer rim 12 which may be treated to glow. As shown on FIG. 3, these tops 10 fit onto the cup 13 which holds the drink. A trademark 18 may be placed on the side of the drink container 13 as well as on the top 10. This shows how a separate glowing design, here arrow 33, may be used to show an area or interest, here the straw hole 7.

FIG. 3 also shows a drink holder 19 which also has a rim 14 which would glow in the dark to allow the user to more easily fit the cup 13 within the opening 20 defined by the drink holder 19. The drink holder 19 has some attachment means, here a clip 15 which attached to the vehicle or other point of attachment 16. In this case, a bulb 34 illuminates a strand of fiber optic or light conducting glass 36 to a second light conducting glass 35 traveling around or within the rim 14. The light conducting glass 35 may be encased in clear material so that it is protected from contact.

Figure 5:
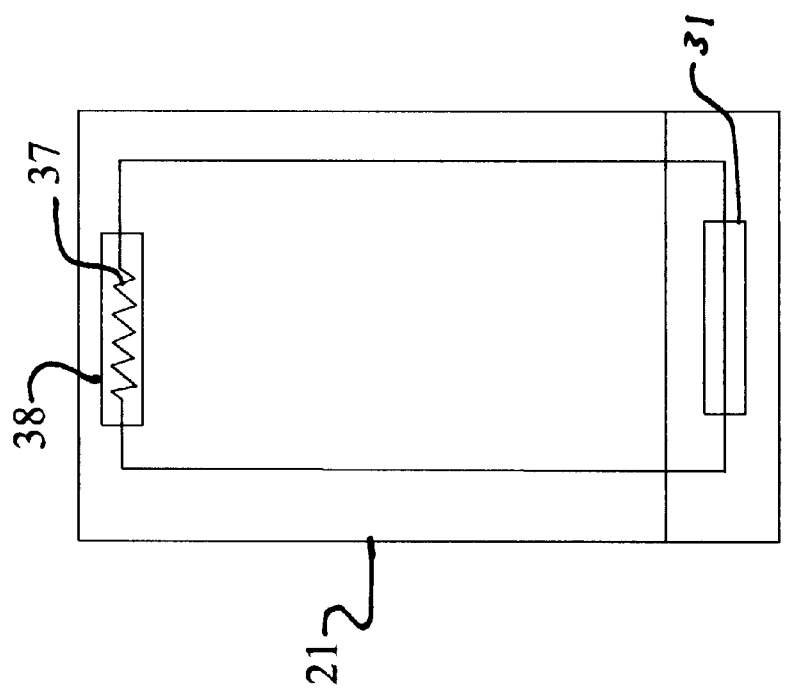
FIG. 5 shows a side view of the can shown in FIG. 4.
Figure 4:
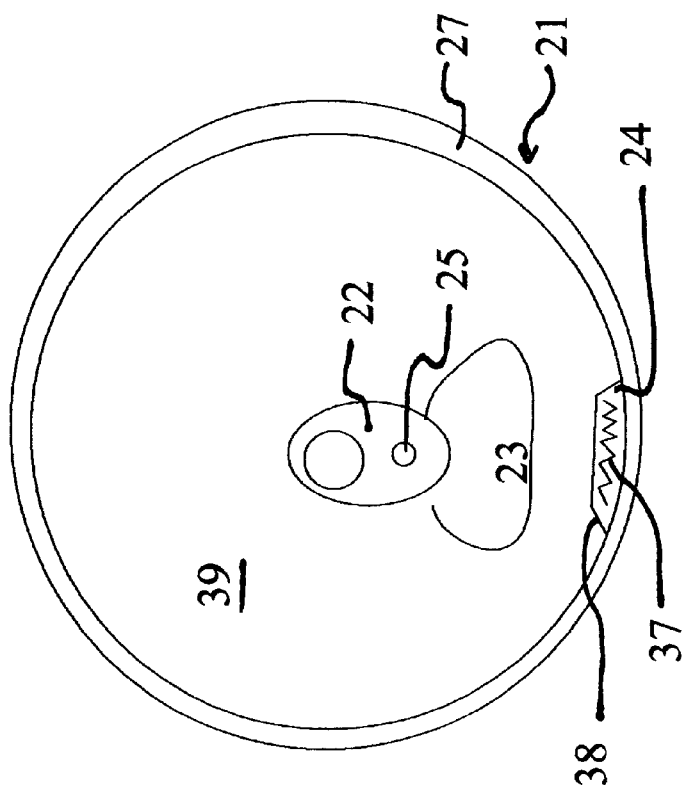
FIG. 4 shows a can top.

FIG. 4 shows a can top 39 which has a standard pop top opening 23 having a lever arm 22 mounted on a pivot 25 which is typically a rivet as is known in the art. The improvement taught is to have the lever arm 22 glow in the dark. Additionally, the point 24 of the rim 27 which is closest to the opening 23 may be made or painted with flourescent material or may, as shown here, be a bulb 37 encased within a casing 38 and which is powered by a power source 31, here a battery. Similarly the flourescent paint may extend to the side of the can 21 adjacent to the closest point of the rim 27 to the opening 23 as shown in FIG. 5.

Because many varying and different embodiments may be made within the scope of the inventive concept herein taught and because many modifications may be made in the embodiment(s) herein detailed in accordance with the descriptive requirements of the law, it is to be understood that the details herein are to be interpreted as illustrative and not in a limiting sense.

What is claimed is:

1. I claim a lid for a container wherein the container has a container rim and a perimeter comprising a cover fitting over the container rim and wherein the cover further comprises at least one top opening having a top opening perimeter within the container perimeter and further comprising a top opening cover for removably covering the top opening and wherein the removable cover further comprises a tab for at least partially removing the cover and wherein the top opening cover is treated with a glow means for glowing in the dark.

2. The invention of claim 1 wherein the tab comprises a lever pivoting around the top opening and where the glow means illuminates the tab.

3. The lid of claim 1 wherein the glow means further provides a plurality of glow means at varying distances from the top opening and wherein the plurality of glow means provide varying degrees of illumination as they approach the at least one top opening.

4. The lid of claim 3 wherein the degrees of illumination vary by color.

5. The lid of claim 3 wherein the degrees of illumination vary by shape.

6. The lid of claim 3 wherein the degrees of illumination vary by separation from one another.

7. The lid of claim 1 wherein the glow means further comprises a flourescent paint.

8. The lid of claim 1 wherein the flourescent paint is sealed within a clear container.

\* \* \* \* \*